July 12, 1955
V. G. COMPARETTE
2,712,693
DEVICE FOR EXTRUDING BALLS OF MOZELLE CHEESE
Filed Feb. 4, 1952
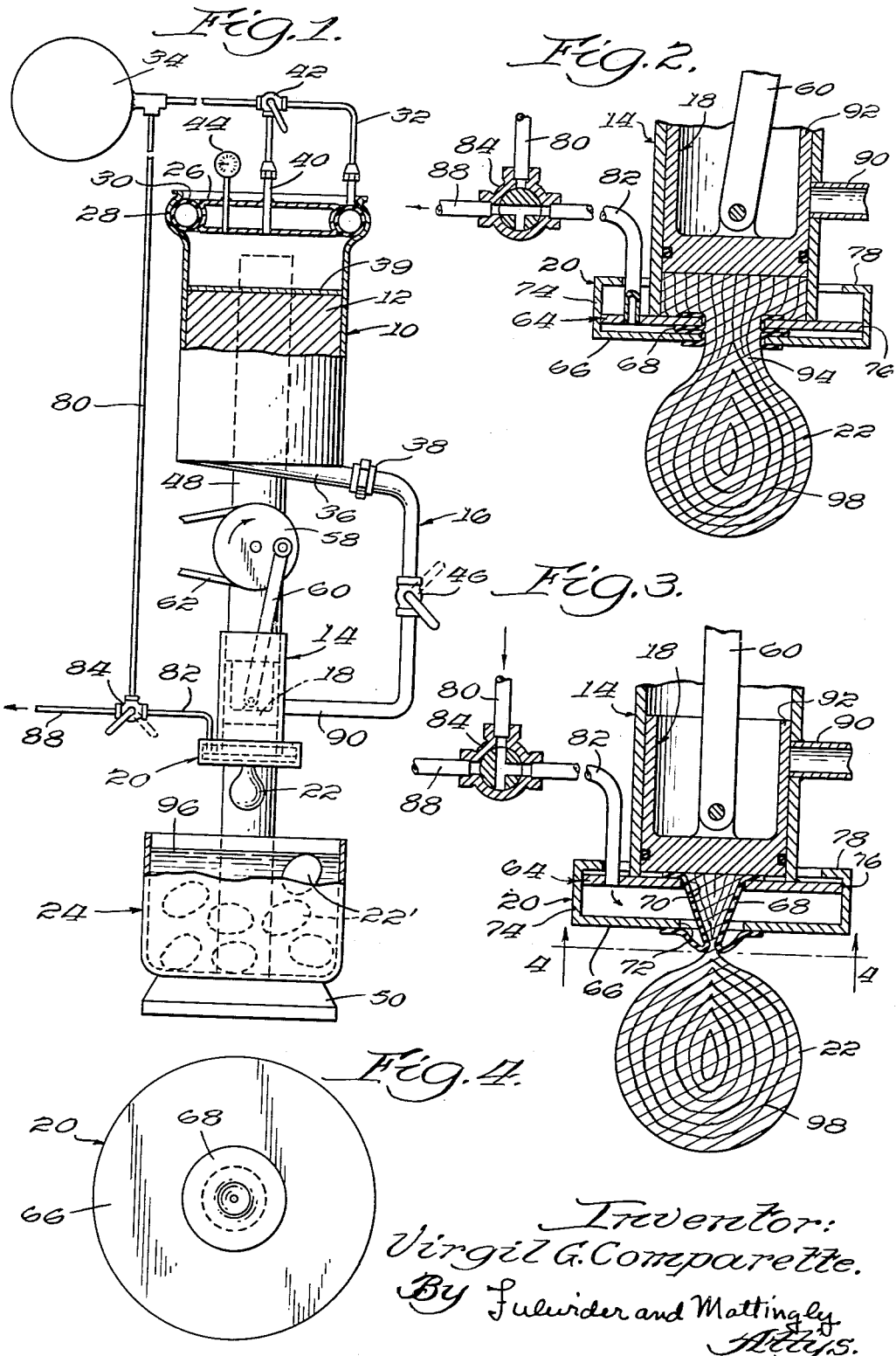
Inventor:
Virgil G. Comparette.
By Fulwider and Mattingly
Attys.

United States Patent Office 2,712,693
Patented July 12, 1955

2,712,693

DEVICE FOR EXTRUDING BALLS OF MOZELLE CHEESE

Virgil G. Comparette, Gardena, Calif.

Application February 4, 1952, Serial No. 269,798

7 Claims. (Cl. 31—13)

The present invention relates to novel apparatus for forming pliable material into orbicular or ball-shaped units.

In the embodiment set forth herein, the invention is shown applied to a device for extruding and cutting off a special type of ball cheese, generally known as Mozelle cheese. This particular type of ball cheese cannot be formed in the conventional manner by molding, inasmuch as its structure incorporates laminations; a finished ball closely resembling the structure of an onion. Moreover, it is imperative that the edges of the laminations each be sealed whereby air cannot enter therein. Hence, the manufacture of Mozelle cheese requires special forming techniques, and to the best of my knowledge, such manufacture has heretofore been accomplished solely by hand.

The disadvantages arising from hand-forming of this cheese will be obvious. Such work is tedious, time-consuming and expensive. Moreover, certain problems of sanitation are bound to occur. Also, the balls of hand-formed cheese will not be of uniform configuration. For these reasons there has long existed a definite need for a mechanical device capable of forming Mozelle cheese balls.

It is a major object of the present invention to provide novel apparatus capable of forming cheese balls quickly, inexpensively and under rigid sanitary conditions.

It is a further object of the present invention to provide apparatus for forming pliable material into orbicular units, which apparatus may be inexpensively manufactured and will not require extensive maintenance.

Another object of the present invention is to provide apparatus for forming pliable material into orbicular units with which any number of such units may be produced, these units all being of substantially uniform configuration.

It is a more particular object of the present invention to provide unique apparatus of this type especially adapted to form Mozelle cheese balls, which balls will closely resemble the appearance and structure of hand-formed Mozelle cheese balls.

Other objects and advantages of the present invention will become apparent from the following detailed description of a preferred embodiment thereof, taken in conjunction with the following drawings, wherein:

Figure 1 is a side elevational view, partly in section, of a novel forming device constructed in accordance with the present invention;

Figure 2 is a fragmentary and enlarged sectional view of a detail shown in Figure 1 which view is taken during a step in the forming operation.

Figure 3 is a view similar to Figure 2 but taken during a subsequent step in the forming operation;

Figure 4 is a view taken on lines 4—4 of Figure 3.

Referring to the drawings, there is shown in Figure 1 novel apparatus for forming a body of Mozelle cheese into a plurality of balls. This apparatus comprises generally a receptacle 10 for the body of cheese 12; a cylinder 14 into which the cheese 12 may be transferred through a conduit 16; a piston 18 for forcing cheese out of the bottom of the cylinder; forming means 20 mounted at the bottom of the cylinder for forming the cheese forced out of the cylinder into balls 22; and a tub 24 containing water for receiving the cheese balls 22.

More particularly, the receptacle 10 is preferably cylindrical in cross section and will be open-topped. A cover 26 for the receptacle is shown secured within an annular belled-out portion 28 formed at its upper end by means of a tubular ring 30 of resilient material, such as rubber. This ring 30 will be maintained in inflated condition in order to secure the cover 26 within the receptacle portion 28, which inflation will also cause this ring to act as a seal between the receptacle and the cover. Inflation of the ring 30 may be effected by means of piping 32 connected to a source of air under pressure, which source is shown in the form of a tank 34.

The base of the receptacle 10 includes an outlet pipe 36, the lower end of which is shown connected to the upper end of the conduit 16 by means of a coupling 38. In order to force the body of cheese 12 downwardly through the outlet pipe 36, conduit 16, and into the cylinder 14, there may be provided in the receptacle 10 a pusher disc 39. Downward movement of this disc within the receptacle may conveniently be effected by air pressure. To this end, there is shown a pipe 40 secured within the cover 26 and connected to the air tank 34. With this arrangement a hand-operated valve 42 may be utilized to control the admission of air to both the ring 30 and the interior of the receptacle 10. Preferably, an indicator 44 will be mounted upon the cover 26 for showing the pressure at which such air exists.

The receptacle 10, cylinder 14 and tub 24 are shown mounted by an upright frame member 48 having a base 50. This frame member 48 may also mount means for effecting vertical reciprocation of the piston 18 within the cylinder 14. Such means will preferably include a crank wheel 58 and a crank rod 60. The wheel 58 is shown as being belt-driven; a belt 62 extending therefrom to a source of power (not shown). Rotation of the crank wheel 58 in a clockwise direction, as indicated by the arrow, will cause the piston 18 to reciprocate within the cylinder 14 whereby cheese disposed below the piston will be forced downwardly through the lower end of the cylinder. As the cheese is forced out of the cylinder in this fashion the forming means 20 will form it into a ball 22.

As shown clearly in Figures 2, 3 and 4, the forming means 20 includes a generally disc-like base member 64, taking the form of a cylinder head in the disclosed embodiment; a generally disc-like plate member 66 disposed below the cylinder head 64; and a sleeve 68 formed of natural or synthetic rubber and having its opposite ends secured respectively to said cylinder head and to said plate. The cylinder head 64 is formed with an aperture 70 coaxial to the cylinder 14, while the plate 66 is formed with a similar coaxial aperture 72. The sleeve 68 is also seen to be arranged with its longitudinal axis coaxial to the axis of the cylinder.

It is anticipated that guide means be provided whereby the plate 66 may be moved downwardly a predetermined distance away from the cylinder head 64 along their common axis. Such guide means may conveniently take the form of upstanding side walls 74 formed upon the plate 66, which side walls will slidably and sealingly engage the periphery 76 of the cylinder head. The upper end of the side walls 74 are formed with a radially inturned flange 78 adapted to engage the upper surface of the cylinder head 64 so as to limit the downward movement of the plate 66. The force for effecting downward movement of the plate 66 will preferably be provided by the introduction of air under pressure between the cylinder head and the plate. Such air may conveniently be supplied from the tank 34. To this end there are shown pipes 80 and 82 and a hand-operated valve 84.

The sleeve 68 is shown secured at its upper end to the head 63 and at its lower end to the plate 66. The rigidity of this sleeve should be such that its walls will be fairly flexible. This condition is necessary in order that these walls may be expanded radially outwardly relative to the apertures 70 and 72 at such time as the plate 66 is in its uppermost position as shown in Figure 2. Such expansion may be most easily produced by connecting the space between the head 64 and the plate 66 with a source of vacuum. To this end there is shown a pipe 88 secured at one end to the valve 84 and having its other end in communication with a source of vacuum, not shown. It is likewise contemplated that at such time as the plate 66 is in its lowermost position of Figure 3, the walls of the sleeve 68 be contracted radially inwardly relative to the apertures 70 and 72. This action may conveniently be effected by the air utilized to force the plate downwardly, which air enters the space between the head and the plate through pipes 80 and 82.

In the operation of the aforedescribed apparatus, the Mozelle cheese will be prepared in a manner known to those skilled in the art, either within the receptacle 10, or within another container whereafter it will be dumped into the receptacle. The cover 26 will then be disposed upon the receptacle and the valve 42 turned so as to direct air under pressure into the ring 30 and the interior of the receptacle. The air pressure will urge the pusher disc 39 downwardly thereby forcing cheese 12 through the outlet pipe 38 and the conduit 16; the valve 46 being turned to its open position. The cheese 12 will thus ultimately be forced through the lower end 90 of the conduit 16 into the cylinder 14. It should be noted, however, that inasmuch as the piston 18 includes an upwardly extending skirt 92, the cheese may not enter the cylinder except at such time as the piston is moved to a raised position, whereupon a slug of cheese will be forced thereunder. The exact size of this slug may be varied as desired, depending upon the amount of air pressure used and the diameter selected for the conduit 16.

After a slug of cheese has entered the cylinder, all or a portion thereof, will be forced downwardly through the apertures 70 and 72 upon downward movement of the piston 18. At this time the valve 84 should be turned so as to connect the space between the head 64 and the plate 66 with the source of vacuum. This is the condition depicted in Figure 2. Next, the valve 84 may be turned so as to connect the space between the head 64 and the plate 66 with the tank 34. This action will cause the plate 66 to move to its lowermost position and simultaneously contract the walls of the sleeve radially inwardly, relative to the apertures 70 and 72. In this manner, the neck 94 of the cheese ball 22 will be squeezed until it is of so small a diameter as to be unable to support the body of the ball. This is the condition depicted in Figure 3. The cheese ball 22 will then fall into the tub 24. Preferably, as shown in Figure 1, this tub will contain cold water 96 wherein the balls 22' may remain until the body of cheese 12 within the receptacle 10 has all been formed into balls.

It should be noted that the cheese balls 22 as extruded from the cylinder will possess a laminated structure, as indicated by the lining 98 in Figures 2 and 3. The subsequent contraction of the walls of the sleeve 68 will force these laminations together as the upper end of the ball is necked. As shown in Figure 3, at the time the neck 94 is severed, the outer lamination will be closed. In this manner the edges of the laminations will be sealed whereby air cannot enter the completed ball structure.

It should also be noted that the use of the described apparatus precludes the necessity of human contact with the balls of cheese. Hence, these balls may be produced under the most sanitary conditions.

It will be apparent to those skilled in the art that apparatus embodying the present invention may be utilized for other purposes than forming Mozelle cheese balls. Instead, this apparatus may find use in many other operations where it is desired to form a body of pliable or plastic material into orbicular or globular units. Moreover, it is obvious that other modifications and changes may be made without departing from the spirit of the present invention or the scope of the following claims.

I claim:

1. Apparatus for forming pliable material into orbicular units, comprising: a receptacle for said pliable material; a cylinder; conduit means interconnecting said receptacle and said cylinder; means operatively associated with said cylinder for forcing said material out one end of said cylinder; a head for one end of said cylinder formed with a coaxial aperture; a plate arranged adjacent said head and formed with an aperture aligned with the aperture of said head; means operatively associated with said head and plate for producing relative movement between said head and said plate toward and away from each other along the axis of said cylinder; and a rubber-like sleeve disposed coaxial to said apertures between said head and said plate, the opposite ends of said sleeve being secured respectively to said head and to said plate.

2. Apparatus for forming pliable material into orbicular units, comprising: a receptacle for said pliable material; a cylinder; conduit means interconnecting said receptacle and said cylinder whereby said material may be transferred into said cylinder; a piston in said cylinder; means operatively associated with said cylinder for urging said piston toward one end of said cylinder; a head for one end of said cylinder formed with a coaxial aperture; a plate arranged adjacent said head and formed with an aperture aligned with the aperture of said head; means operatively associated with said head and plate for producing relative movement between said head and said plate toward and away from each other along the axis of said cylinder; and a rubber-like sleeve disposed coaxial to said apertures between said head and said plate, the opposite ends of said sleeve being secured respectively to said head and to said plate.

3. Apparatus for forming pliable material into orbicular units, comprising: a receptacle for said pliable material; a cylinder; conduit means interconnecting said receptacle and said cylinder whereby said material may be transferred into said cylinder; a piston in said cylinder; means operatively associated with said cylinder for urging said piston toward one end of said cylinder; a head for one end of said cylinder formed with a coaxial aperture; a plate arranged adjacent said head and formed with an aperture aligned with the aperture of said head; means operatively associated with said head and plate for producing relative movement between said head and said plate toward and away from each other along the axis of said cylinder; a rubber-like sleeve disposed coaxial to said apertures between said head and said plate, the opposite ends of said sleeve being secured respectively to said head and to said plate, the walls of said sleeve expanding radially outwardly relative to said apertures when said head and said plate are in a closely spaced position, and the walls of said sleeve contracting radially inwardly relative to said apertures when said head and said plate are at their most remotely spaced position.

4. Apparatus for forming pliable material into orbicular units, comprising: a receptacle for said pliable material; a cylinder; conduit means interconnecting said receptacle and said cylinder whereby said material may be transferred into said cylinder; a piston in said cylinder; means operatively associated with said cylinder for urging said piston toward one end of said cylinder; a head for one end of said cylinder formed with a coaxial aperture; a plate arranged adjacent said head and formed with an aperture aligned with the aperture of said head; means operatively associated with said head and plate for producing relative movement between said head and said plate toward and away from each other along the axis of said cylinder; a rubber-like sleeve disposed coaxial to said apertures between said head and said plate, the opposite ends of said sleeve being secured respectively to said head and to said plate, said sleeve selectively contracting and expanding relative to said apertures.

5. Apparatus for forming pliable material into orbicular units, comprising: a receptacle for said pliable material; a vertically disposed cylinder; means operatively associated with said cylinder for transferring said material from said receptacle into said cylinder; a piston in said cylinder; means operatively associated with said cylinder for effecting vertical reciprocation of said piston within said cylinder; a cylinder head closing the bottom of said cylinder, said head being formed with a coaxial aperture; a plate disposed below said head and formed with an aperture aligned with the aperture of said head; guide means interconnecting said head and said plate whereby said plate may be moved toward and away from said head along the axis of said cylinder; means operatively associated with said head and plate for selectively urging said plate downwardly a predetermined distance away from said head; a rubber-like sleeve disposed coaxial to said apertures between said head and said plate and having its opposite ends secured respectively to said head and to said plate, the walls of said sleeve expanding radially outwardly relative to said apertures when said head and said plate are in a closely spaced position, and the walls of said sleeve contracting radially inwardly relative to said apertures when said head and said plate are at their most remotely spaced position.

6. Apparatus for forming pliable material into orbicular units, comprising: a receptacle for said pliable material; a vertically disposed cylinder; means operatively associated with said cylinder for transferring said material from said receptacle into said cylinder; a piston in said cylinder; means operatively aassociated with said cylinder for effecting vertical reciprocation of said piston within said cylinder; a cylinder head closing the bottom of said cylinder, said head being formed with a coaxial aperture; a plate disposed below said head and formed with an aperture aligned with the aperture of said head, said plate also being formed with side walls having a sliding and sealing fit with the periphery of said head whereby said plate may be moved toward and away from the under side of said head along the axis of said cylinder; means interposed between said cylinder and plate for limiting the downward movement of said plate; a rubber-like sleeve disposed coaxial to said apertures between said head and said plate, the opposite ends of said sleeve being secured respectively to said head and to said plate; a conduit for selectively connecting the space between said head and said plate with a source of fluid existing under pressure and a source of vacuum; and valve means for alternately connecting said conduit with said pressure whereby said plate will be forced away from said head while the walls of said sleeve are contracted radially inwardly relative to said apertures, and with said vacuum whereby said plate may return upwardly against the under side of said head while the walls of said sleeve are expanded radially outwardly relative to said apertures.

7. Apparatus for forming pliable material into orbicular units, comprising: a receptacle for said pliable material; a vertically disposed cylinder; means for transferring said material from said receptacle into said cylinder; a piston in said cylinder; means operatively associated with said cylinder for effecting vertical reciprocation of said piston within said cylinder; a cylinder head closing the bottom of said cylinder, said head being formed with a coaxial aperture; a plate disposed below said head and formed with an aperture aligned with the aperture of said head, said plate also being formed with vertical side walls having a sliding and sealing fit with the periphery of said head whereby said plate may be moved toward and away from the under side of said head along the axis of said cylinder; a radially inturned flange formed upon the upper portion of said side walls adapted to engage a horizontal surface of said head so as to limit the downward travel of said plate relative to said head; a rubber-like sleeve disposed coaxial to said apertures between said head and said plate, the opposite ends of said sleeve being secured respectively to said head and to said plate; a conduit for selectively connecting the space between said head and said plate with a source of fluid existing under pressure and a source of vacuum; and valve means for alternately connecting said conduit with said pressure whereby said plate will be forced away from said head while the walls of said sleeve are contracted inwardly relative to said apertures, and with said vacuum whereby said plate may return upwardly against the under side of asid head while the walls of said sleeve are expanded radially outwardly relative to said apertures.

References Cited in the file of this patent

UNITED STATES PATENTS

| Number | Name | Date |
|---|---|---|
| 1,898,705 | Wood et al. | Feb. 21, 1933 |
| 2,126,416 | Schlichter | Aug. 9, 1938 |
| 2,310,463 | Russell | Feb. 9, 1943 |
| 2,568,293 | Nelson | Sept. 18, 1951 |